Dec. 4, 1945. W. H. DE LANCEY 2,390,240
POWER TRANSMITTING MECHANISM
Filed Aug. 21, 1943 3 Sheets-Sheet 1

INVENTOR
WARREN H. DeLANCEY
BY
Chapin & Neal
ATTORNEYS

Dec. 4, 1945.  W. H. DE LANCEY  2,390,240
POWER TRANSMITTING MECHANISM
Filed Aug. 21, 1943  3 Sheets-Sheet 2
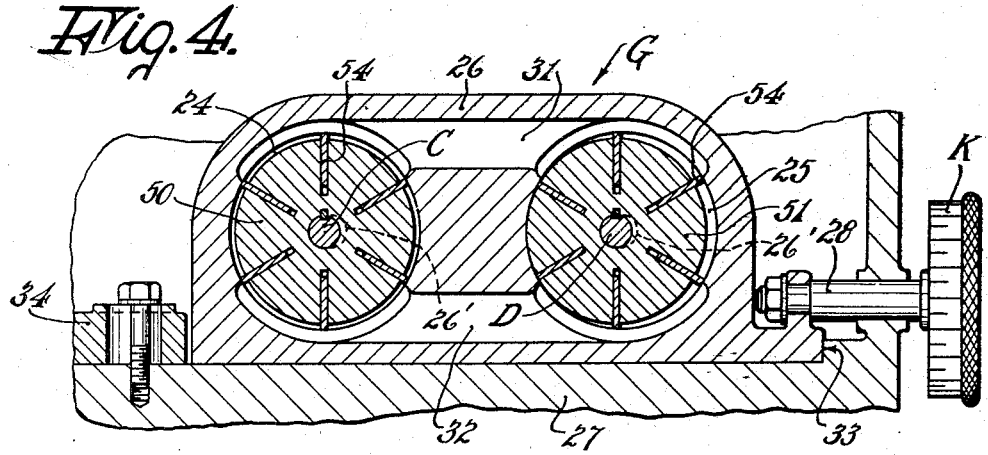
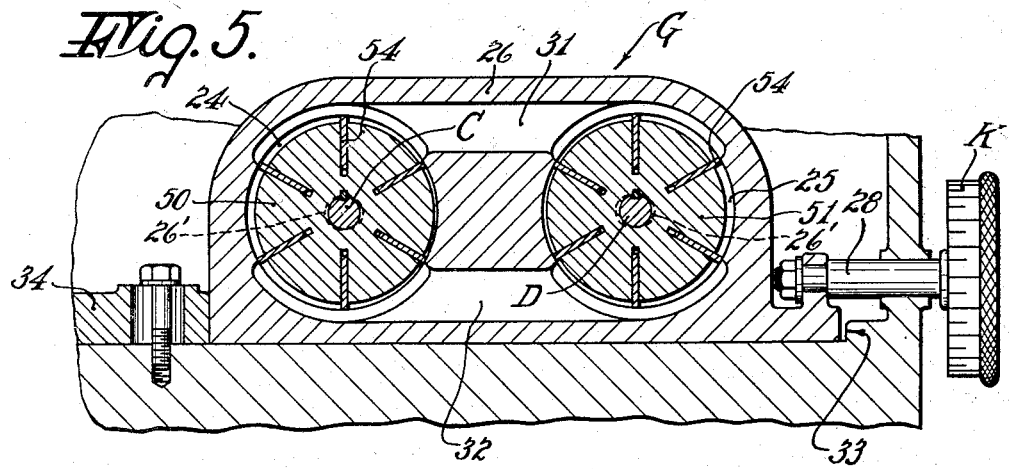
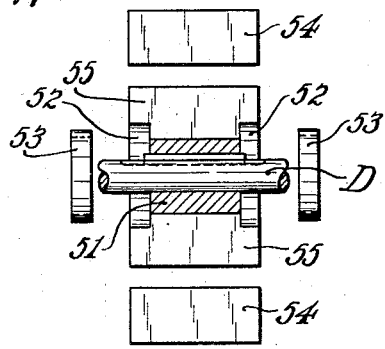
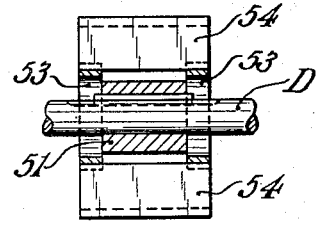
INVENTOR
WARREN H. DeLANCEY
BY
Chapin & Neal
ATTORNEYS Dec. 4, 1945.  W. H. DE LANCEY  2,390,240

POWER TRANSMITTING MECHANISM

Filed Aug. 21, 1943  3 Sheets-Sheet 3

INVENTOR
WARREN H. DE LANCEY
BY
Chapin & Neal
ATTORNEYS

Patented Dec. 4, 1945

2,390,240

UNITED STATES PATENT OFFICE 2,390,240

POWER TRANSMITTING MECHANISM

Warren H. De Lancey, Springfield, Mass., assignor to Gilbert & Barker Manufacturing Company, West Springfield, Mass., a corporation of Massachusetts Application August 21, 1943, Serial No. 499,567

4 Claims. (Cl. 74—189.5)

My invention relates to a power-transmitting mechanism or variable speed drive. Its principal use is for transmitting the power from an electric motor when reduced speeds are wanted. There are many known ways to do this. My way is a new one with respect to its structure and also with respect to a preferred manner of limiting the operation to avoid power loss. An embodiment of the invention may be used as an accessory to couple an ordinary motor to a machine to be driven, or it may be built in as part of the motor assembly, or as part of the machine assembly.

In my invention I employ shafts, a single differential gear train, one set of the sun and planet gear type for example, a pair of rotary vane positive pumps, at least one and preferably both pumps of the variable capacity type, and hand control means to vary the relative capacities of the pumps. All the elements mentioned are generally old. But, as will be seen, I prefer to provide the pumps and their adjusting means in a new form to help my general plan and its operation.

The main object of my invention is to make a new and useful combination of the elements mentioned, which will result in a very low cost, and, in addition, to provide for minimizing power losses in their combined operation. Other general and some more specific objects will be seen from considering a full disclosure of an embodiment.

In the accompanying drawings:

Figs. 4 and 5 are cross-sections on line 4—5 of Fig. 10, indicating two different positions of parts of my adjusting device;

Figs. 6 to 9 are details of pump construction in the adjusting device;

Figure 1:
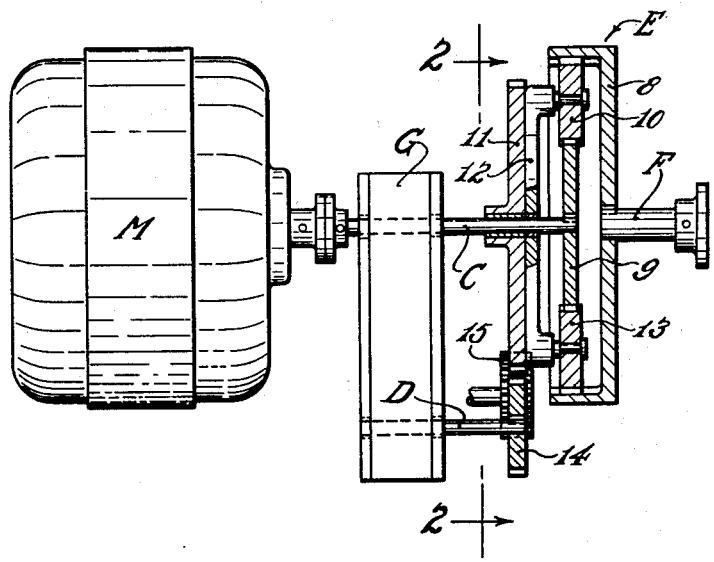
Fig. 1 is a diagram of an embodiment of my invention adapted to drive a driven shaft at any speed from a minimum to a maximum; this view indicates the approximate size of an ordinary electric motor in relation to its transmission; for example, a one horse power motor is of about the same overall dimension as the transmission attachment, in the preferred arrangement.
Figure 2:
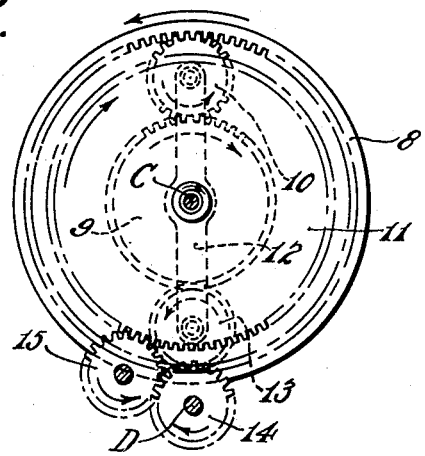
Fig. 2 is a diagram looking from the left, line 2—2, of Fig. 1.

The invention may be embodied in a device for varying the speed of a driven shaft from minimum to a maximum in one direction, without reverse, from a driving shaft turning likewise in one direction. A preferred example is illustrated in Figs. 1, 2, 4, and 5.

The driving shaft C passes through the member G. In alignment with the driving shaft C is the driven shaft F. Between the driving shaft C and the driven shaft F is the gearing E, consisting of the following: Loosely mounted on the shaft C is a gear 11 to which is secured a yoke 12 provided with stubs on which are mounted planet gears 10 and 13. The planet gears mesh with the internal gear 8 fast on shaft F and with the external gear 9 fast on shaft C. Gear 11 meshes with an idler 15 which meshes with a gear 14 fast on shaft D. M represents a motor, the prime mover coupled to shaft C.

If the shaft D were not held in any way and there is a load on shaft F, the gearing 9, 10, 13, 11, 15, and 14, driven by shaft C, would rotate the shaft D freely in the same direction as shaft C and no power would be applied to shaft F. The torque applied by the driving shaft C can drive shaft F only if it is resisted by shaft D. The shafts C and D are connected to pump mechanism adapted to operate with liquid movable in a closed circuit.

The member G contains the pump mechanism by which the shaft D may be held stationary or may be permitted to turn at any desired speed up to the maximum and thereby cause the driven shaft F to be driven at its maximum speed or at any other desired lower speed down to zero if that is selected as the limit. As I will point out latter, I prefer to operate with a higher limit than zero for the lower speed.

In the example shown, the shafts C and D are mounted in bearings outside of the member G, the sides of which are slotted as at 26' to permit the casing 26, Fig. 5, to be moved relatively at hight angles to the shafts. Each shaft passes through a cylindrical cavity 24, 25 in the casing 26 and has a pump rotor secured to it, from slots in which loosely extend blades, which, when a shaft revolves, are projected radially outward, as will be explained, against the cylindrical wall of the cavity. The cavities, which are filled with a liquid, preferably oil, are connected by passages 31 and 32 in the casing so that, when the shafts and their blades revolve, the liquid may flow through a closed circuit consisting of the two cavities and the passages 31 and 32 between them.

The casing 26 may be adjusted sidewise to bring the cylindrical wall of cavity 24 eccentric to the axis of the shaft C, Fig. 5, or to bring the cylindrical wall of cavity 24 concentric with the axis of shaft C, Fig. 4, or to any intermediate position. The stops 33 and 34 of Fig. 5 are indicated to limit the eccentricity of cavity 24 with respect to the modification of the preferred example being described. The casing, slidable on bed 27, may be adjusted sidewise with nicety by the screw 28 which engages a lug on the base of the casing and may be turned by the calibrated head K.

When the casing is moved fully to the left to the position against stop 34 shown in Fig. 5, both shafts C and D are equally, but oppositely, eccentric to their respective cylindrical walls or cavities 24 and 25. In such case both shafts can and will revolve in the same direction at the same speed because the load on shaft F offers a greater resistance to any torque derived from shaft C tending to turn shaft F than the mere frictional resistance to turning of shaft D. Then gear 8 is stationary and gear 9 rolls the planet gears 10 and 13 on gear 8. With the gears proportioned as shown, Fig. 1, the radius of the planet gears is one-half the radius of gear 9 and the radius of gear 11 is three times the radius of gear 14, and hence the R. P. M. speed of 14 and of shaft D is equal to the R. P. M. speed of shaft C. Hence, the load on shaft F, which resists any tendency to turn that shaft, holds shaft F stationary when the casing 26 is against stop 34 in the extreme left-hand position shown in Fig. 5.

When the casing 26 is moved fully to the right against stop 33, as shown in Fig. 4, shaft C still tries to drive shaft D through gearing E, but shaft D is held stationary because the shaft C, being in the center of the cavity 24, is not pumping and merely carries the liquid between its blades around and around, so that there can be no movement of the liquid in the passages 31, 32, and therefore the liquid in the cavity 25, which liquid is likewise immovable, holds the blades on shaft D and shaft D from revolving.

With shaft D thus stationary, the shaft C will drive shaft F as follows: When the shaft D is stationary, the gears 14, 15, and 11 are likewise stationary, Fig. 1 and Fig. 2. Assuming that c equals the R. P. M. or speed of the shaft C, the speed of the gear 9 is likewise c and, with the gears proportioned as shown in the figures, the radius of gear 9 being twice the radius of gear 10, the gear 10 has a speed of 2c. And, as the radius of the internal gear 8 is four times the radius of the planet gears 10 and 13, the speed of the internal gear 8 is c/2, which is likewise the speed of the shaft F which is rotated in the opposite direction to shaft C.

Hence, with the shaft D held stationary, as shown in Fig. 4, shaft F will be driven at one-half the speed of the shaft C. This is the maximum speed for shaft F with the gears so proportioned.

Thus, by moving the casing 26 from its position shown in Fig. 5 to its position shown in Fig. 4, the R. P. M. speed of the driven shaft F may be increased from zero, Fig. 5, to its maximum, Fig. 4, which in the example is equal to one-half the R. P. M. speed of shaft C.

Next, suppose that the casing 26 is moved to the right from its position in Fig. 5, in which the shaft D revolves at the same speed as the shaft C and shaft F is not driven, to a position in which the casing is not so eccentric to shaft C as in Fig. 5, but is not concentric as in Fig. 4. Then the load on shaft F will react through the gearings 8, 10, 13, 11, 15, and 14 to try to turn shaft D and the blades on shaft D tend to impel the liquid in the cavity 25 through the passage 32 into the cavity 24. And, as shaft C is eccentric in cavity 26, its blades tend to impel the liquid in the same circular direction through the passage 31 into the cavity 25. Hence, there is a circulation of liquid in the closed circuit 25, 32, 24, and 31.

But, as the pumping capacity of the blades on shaft C is limited by the degree of partial eccentricity of the shaft C in the cavity 24, those blades limit the amount of circulated liquid which can move between them and in proportion to such eccentricity. The less the eccentricity, the smaller the amount of liquid that can circulate and the less the speed of shaft D and the greater the speed of the driven shaft F. Or, conversely, the greater the eccentricity of shaft C, the larger the amount of liquid that can circulate and the greater the speed of shaft D and the less the speed of the driven shaft F.

Figure 3:
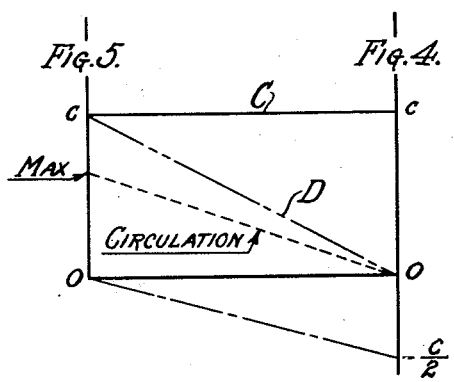
Fig. 3 is a diagram of the speed relations of the several shafts.
Figure 8:
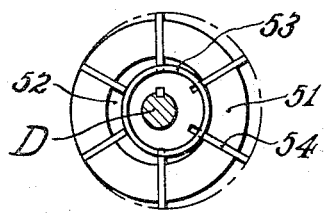
Figure 9:
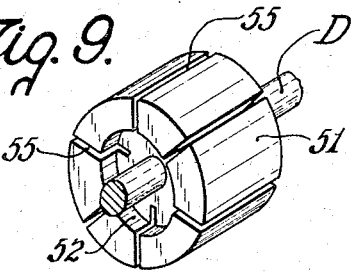

The effects are indicated diagrammatically in Fig. 3. The R. P. M. speed of C is taken as a constant c. When the flow of circulating liquid is zero, as in Fig. 4, the speed of D is zero and the speed of F is −c/2, its maximum. As the flow of circulating liquid increases, as casing 26 is adjusted to the left, the speed of D increases and the speed of F decreases. When the flow of circulating liquid reaches its maximum, with the casing in position of Fig. 5, the speed of D equals that of C and the speed of F is zero.

The power imparted to the shaft F is equal to the power of the shaft C, deducting the loss due to friction of the gearing and in turning the shafts C and D and the loss due to operating hydraulic device G. This device by my arrangement will operate with the rotor on control shaft D working as a pump and the rotor on shaft C working as a motor. This relation is a constant one throughout the operating range for all speed and torque relations wanted in driving the machine. The relation is preferably and purposely made constant for this reason. The control operation in converting mechanical power to hydraulic and back to mechanical power gives a power loss. The way to hold this loss down substantially is to provide the relation I have provided, as above stated, for adjusting device G and shafts C and D. The control shaft D is always the pump shaft, while driving shaft C is always the hydraulic motor shaft in the relation. If this relation were reversed and the machine were driven any length of time, there would be a continual unnecessary power loss. It could be measured by the added amount of power transmitted through adjusting device G, which must operate as a power converter. The difference is substantial, and in running machine tools it would add up to a bad loss of current. But by my arrangement this loss is avoided in one substantial range of possible power loss. There is a further advantage in providing for the relations mentioned. This advantage is because the adjusting device G may be kept to a smaller size and operate with lower hydraulic pressures, than it can if more power needed to be transmitted through it.

There is no power loss, as from brakes, because there is no brake. In driving through a differential gearing there is an input of power and two means, such as shafts, by which there may be two outputs of power. For illustrating this situation in Fig. 1 the differential gearing there shown has shaft C for the input of power, and the two shafts D and F for the two outputs of power. In this arrangement D is the control shaft for the differential E. When, in the differential E, shaft C is fast to gear 9 the latter is the input gear. When shaft F is fast to gear 8 then the latter is the output gear. Gear 10 or gear 13 or both together are known as the floating gear. That is the floating gear may be considered as the one free to rotate in a differential having the principles of this one which has a power input gear and a power output gear, the relative rotations of which are determined by controlling a third gear, which if not controlled would merely revolve idly. It is therefore called the floating gear to distinguish it easily from the others. Of course the term "floating gear" may mean all the gearing in the differential whether one or more, which gearing is free to rotate but if retarded will cause the other gears, as gears 8 and 9 to have the desired differential motions in transmitting the power between them. The differential gear here referred to is of the type having three characteristic gear parts between any two of which power may be transmitted differentially by controlling the third one. In such an arrangement there is one gear with its axis mounted so as to rotate around an axis of one of the other gears. Gear trains with this differential principle in them are of many forms. The form of differential E is one of the simpler ones. If, in Fig. 1, motor M were coupled to shaft D instead of C and device G made to use merely as a control device for retarding gear 9, then gear 9 would be what is here referred to as the floating gear. With this explanation the description will proceed with the understanding that the claims will refer to floating gear as an understandable part of differential gearing E or its equivalent. Referring now to the differential E as a simple differential gear, one power output may be indicated from gear 10, to shaft D and another output from gear 8 to shaft F. Considering these parts alone the following principle of operation should be understood. When one of those outputs is reduced by a brake in order to increase the other output, the power exerted against the brake is lost and is dissipated in heat.

Figure 11:
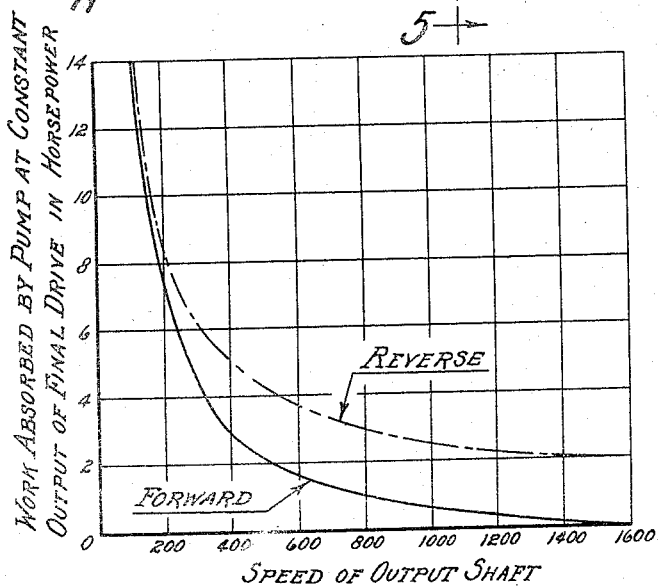
Fig. 11 is a speed and work diagram for consideration in a discussion of the mode of operation provided for in the structure.

In my arrangement with the adjusting device G used as I describe it no power loss occurs by ordinary braking action. When the shaft D is held stationary, with the cavity 24 concentric to the shaft C as in Fig. 5, shaft D merely acts as a reaction point, like a fulcrum, so that the shaft C may transmit its full power to the driven shaft F with only the loss due to the friction of the gearing E. There is no braking effect on the shaft C. Also, when the casing 26 is eccentric to the shaft C (the only other condition), the gearing E turns the shaft D in the same direction as the shaft C in the example given, and therefore assists, and does not hinder, the rotation of shaft C. But, as I will explain in connection with Fig. 11 diagram, there is a power loss of an elusive kind to be considered and guarded against. The power that is delivered through the gearing E to the shaft D is given back to the shaft C, minus power absorbed in the hydraulic device to which I will refer. This particular amount of power can be kept within reasonable limits, as it is only enough to turn shaft D at the adjusted speed ratio to shaft C in a predetermined and satisfactory range or scope of adjustments.

The control of the power delivered to the driven shaft F is positive. This positiveness is due to the incompressibility of the liquid which fills the cavities 24 and 25 and passages 31 and 32. It is due to that incompressibility that the shaft D is held stationary, when the casing 26 is concentric with shaft C, as in Fig. 4, so that shaft F is driven at its maximum speed. Also, the column of incompressible liquid, which circulates when the cavity 24 is eccentric to the shaft C, acts as positively as a sprocket chain or a pair of gears to give the power, which, within my preferred limits of adjustment, is ever diverted from shaft F to operate the shaft D, and in satisfactory amount, back to the shaft C.

As power equals torque times speed, the torque of shaft F, when the speed of D is zero, is equal to twice the torque of shaft C less a loss which may be minimized in ways I point out. Then, as the speed of shaft F decreases, its torque increases.

Thus, by the single epicyclic or differential gear train E and the shafts C and D and the element G, the speed of the shaft F may be varied from a maximum to a minimum, preferably controlling the minimum as somewhat above zero, and its torque from a minimum to a maximum with a minimum of power loss and with a positive control. In the specific example shown with the parts proportioned as indicated, the torque of the shaft F when the shaft D is stationary will be twice that of the shaft C (less a minimized loss) and, as the speed of the shaft F decreases, the torque will rise to a maximum when the shaft F is turning at its low limit of speed or R. P. M.

The utility of the invention, of which Fig. 1 shows an example, has a wide field. It makes an economical unit to apply to any one of all sorts of machines between the electric driving motor M and the main shaft of the machine. It is well adapted for use with any standard type of economical electric motor to drive any machine such as would ordinarily require a much more expensive type of motor or expensive speed-changing device to get the speed and torque ratios desired in the machine operation.

I will point out one or two variations in the detail of the example of Fig. 1 which would change its specific form but retain important principles of its operation. Of course the gear ratios in the differential gearing E may be varied to fit different specific uses. And there are many known types of differential gearing other than the one shown as an example. The shafts could be connected to different gears of the epicyclic gear train of differential E. The shaft D need not be geared to turn in the same direction as shaft C. If gear 11 were put in direct mesh with gear 14, the shafts would necessarily turn oppositely when D turned. In this case, the inlet port of the pump mechanism on shaft D should connect to the outlet port of the pump mechanism on shaft C, and vice versa. That is, if passages 31 and 32 of Fig. 5 were crossed for their ends to join the oppositely arranged ports to cavities 24 and 25, the shafts C and D could turn in opposite directions with the same effect as explained before in detail, understanding that idler 15 would then be out and gears 11 and 14 engaged directly. The example of Fig. 1, as first mentioned, is for varying the speed from zero to a maximum in one direction. Of course, the low limit need not be and preferably is not made zero. The same range can be started from a positive speed above zero. The gearing in differential E in that example gives F a maximum of one-half of the speed of shaft C. The maximum speed of F might be higher by changing the gear ratios of the gear train. Then the minimum speed of shaft D can be changed accordingly.

In considering the example of Fig. 1 as varying speed in one direction, the idea is that shaft F will have a variable speed range with all speeds in one direction.

When it is desired to rotate F in the opposite direction there is a very simple way to do that and retain the combination of Fig. 1. The electric motor M, for example, a constant speed motor, is one commonly made as a standard product in form to turn at a constant speed in either direction. Many other than constant speed types of motors are standard devices adapted to turn in either direction. Such motors are adapted for sending the current through the motor in either direction by means of a switch. So, in the Fig. 1 example, it should be noted that while the mechanism is adapted to operate for varying speeds in one direction, that direction may be either clockwise or counterclockwise, depending merely on the driving direction of the input power. The combination of parts shown in Fig. 1 will adapt itself to either direction according to the direction of motor rotation.

It is also possible to reverse the rotation of shaft F without reversing the motor M, and with structure like that of Fig. 1. This could be done by rearranging the relative capacities of the pump structures, which in the structure shown could be done by moving limiting stop 34, Fig. 4, further to the left, so that the rotor on shaft D could be operated from the rotor on shaft C at a much higher speed. In such a case the speed of shaft D, being higher than shaft C and in the same direction, the direction of rotation of shaft F would become the same as shaft D, rather than opposite, as before. Also, the power used to drive shaft F would flow through the liquid circuit. With respect to the tendency of the load on shaft F to drive one of the shafts by reaction, such reaction would be met by shaft C. Instead of that shaft driving shaft F directly through the differential gearing, it would apply its power to drive the shaft D indirectly through the pump structure, and the high speed shaft D would drive F through the differential gearing. However, one of the important purposes of my invention, but not essential in all my purposes, is to transmit the driving power under the most favorable conditions. I have given these conditions which involve using shaft D to function only as a control shaft.

A preferred embodiment of the adjusting device G is shown in Figs. 4-5 and Figs. 6-9. Casing 26 has cavities 24, 25 connected by passages 31—32. It is movable, by turning calibrated wheel K, for accurate positioning on table 27, with the help of pointer P, Fig. 10, for hand adjustment. Shafts C and D have keyed to them the rotors 50 and 51. The rotor structure and parts carried by it are seen in Figs. 6-9. It is shaped generally as a solid cylinder mounted centrally on its shaft. Recesses 52 are formed in its ends to hold loose rings 53. These are less in diameter than the recesses but of like diameter to each other and engage a series of blades or vanes 54. The rotor has a series of radial slots 55 equally spaced, each extending through the cylindrical surface and opening into the recesses 52. Each blade 54 is put in its slot 55 where it can be pushed inwardly until stopped by engagement of the bottom side margins with the two loose rings 53. These rings, the blades, and the cavities 24 and 25 are dimensioned to get the following relation: When rings 52 are concentric with recesses 52 and with the rotor's shaft, the blades 54 all extend equally beyond the cylindrical surface of the rotor. This is the position of no pumping capacity indicated by the rotor's position on shaft C with respect to cavity 24, in Fig. 4.

In all positions, the blades at their outer ends and sides have a close rotatable or slidable fit with the walls of their cavities for action as rotatable pistons between ports of the rotary pump structure. The amount of eccentricity between the cylindrical cavities and their respective rotors, determines the amount of blade extensions there can be for piston action between ports. The rings 53 force the blades to occupy their proper position because such rings must take the same amount of eccentricity with respect to their adjacent shafts as the rotors take with respect to their cavities 24 and 25. When casing 26 is moved for adjustment, that action moves the blades 54 for their adjustment, and the blades move their rings 53 to a corresponding eccentric relation The side walls of casing 26 close the cavities 24 and 25. Such walls are finished to make a tight but sliding fit with relation to the sides of blades 54 and the ends of rotors 50 and 51. Then when casing 26 is moved as a whole for adjustment, the parts keep their fit for operation of the pump structures for any one of their adjusted capacities.

An adjustable stop 34 mounted on the bed-plate 27 limits the casing adjustment in one direction and fixed shoulder 33 limits it in the other direction. In the example of the invention of Fig. 1 as first described, stop 34 would be adjusted to stop casing 26 against further adjustment, further to the left than indicated in Fig. 5. In that position shafts C and D may turn at the same speed, but with stop 34 in that position shown in Fig. 5 the speed of shaft D cannot be greater than shaft C. While the turning of the adjusting wheel can cause shaft D to have equal or less speed than the shaft C has, it cannot cause shaft D to have more speed. By this arrangement, operation of the Fig. 1 structure is kept within the limits of a one-way transmission, the power being transmitted by shaft C while the speed and torque components are varied by the turning of shaft D. The main power for turning shaft F is not transmitted through the liquid of the pump structure. The hydraulic motor, i. e. the pump structure on shaft C, acts as a metering device to control the volume of fluid delivered by the structure functioning as a pump on shaft D.

But if for any reason one should want to do so when the example of the structure in Fig. 4 is used, stop 34 may be shifted further to the left from that shown in Fig. 4 and far enough for shaft D to do the driving work for shaft F so as to reverse its direction from that of the preferred example.

Figure 10:
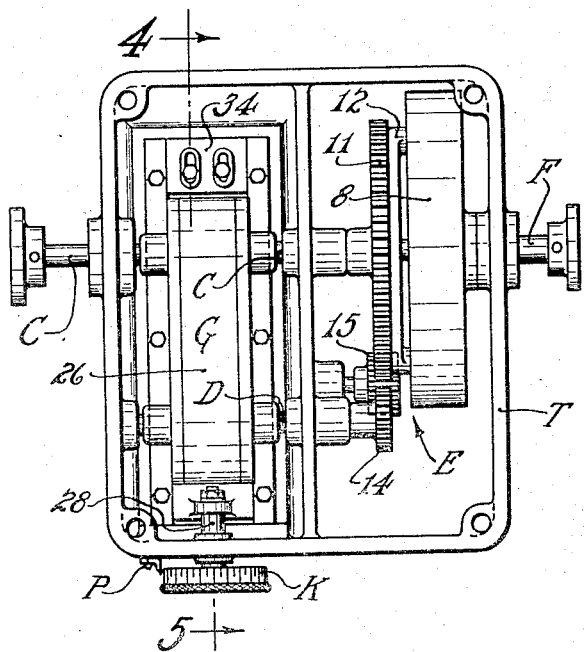
Fig. 10 shows the transmission mechanism of Fig. 1 mounted in a gear box.

A transmission mechanism including the invention of Fig. 1 is shown by Fig. 10 mounted in a "gear" box T. This illustrates one plan of use adapted for coupling between a motor and a machine.

By using my invention between an electric motor and machine the following common practices may now be avoided: using an expensive type of motor to drive a machine; using expensive hydraulic drives with very high hydraulic pressures to transmit power; using friction drives with danger of slipping at critical times; and using complicated electrical transmission appliances as accessory drives. My arrangement will drive the machine with any ordinary motor; the speed and torque can be varied infinitely within all the useful limits, while maintaining the best working conditions which is a mechanical gear drive and a hydraulic control functioning only within the control operation, and resulting in a torque increase proportional to speed decrease. Both the original and maintenance costs of my apparatus are low. The fact that it has such small space requirements makes it suitable for many driving situations where a larger device would not be feasible.

I have referred to my plan for minimizing power losses in the operation of my invention. The diagram of Fig. 11 will make the subject clearer. This diagram shows curves plotted to show the speed of the driven shaft in relation to the work or power absorbed by the hydraulic adjusting device. The figuring for the curve plotting is based on a constant delivery of one horse power by the driven shaft at all speeds. The top curve represents the power loss when the driven shaft F has its direction of rotation determined by running the control shaft D faster than the driving shaft C. The lower curve represents the power loss when the driven shaft has its direction of rotation determined by running the control shaft D slower than driving shaft C.

In comparing the top and bottom curves it is obvious that much power is absorbed in the adjusting device G when it is used to reverse the direction of rotation for shaft F. By setting automatically acting stop 34, as seen in Fig. 5, the rotation of shaft F cannot be reversed by the movement of adjusting device G by handle K. The stop provides a definite limit to the attendant's control. He can reverse his motor when he meets this limit. This should make clear the first way of avoiding power loss.

The second way to avoid power loss will be made clear from the bottom curve. As an example, it represents a top speed of 1600 R. P. M. for shaft F. Then the device G and the pumps are idle. When device G is progressively adjusted to reduce speed, the torque is proportionately increased. Keeping in mind the condition of plotting the curve, that power delivery by shaft F is constant, then the torque varies inversely and increases in direct proportion to the decreasing speed. But the curve shows a power loss and this power must be supplied by more work done by motor M. It takes more current to maintain the constant power delivery on shaft F under the conditions arising when the torque of shaft F is increased by reducing its speed. The curve shows in terms of work, the increased current needed as the speed is reduced for increased torque. It will be clear by considering the work or current used, when the speed reduction is from 1600 down to 200 and below, that the use of power increases very rapidly in the lower end of the range. To keep one horse power on shaft F at 1600 R. P. M., it takes substantially one horse power current in motor M, since the device G takes no power of consequence because shaft D is held stationary in the given condition. But the motor takes about eight horse power current when the torque on shaft F is increased by reducing its speed to 200 R. P. M. This condition entails a serious power loss. But the curve shows that the speed reduction can be made from 1600 R. P. M. down to 800 R. P. M. and maintain the horse power constant on shaft F while increasing the work of motor M by only about one horse power current. Thus, the reduction from 800 R. P. M. to 200 R. P. M., a reduction of 600, uses up eight times the amount needed for the reduction of 800 R. P. M., from 1600 down to 800.

With this condition in mind, the best way to operate my invention is to provide for limiting the range of speed reductions at a chosen point above zero. As my bottom curve shows, there is, for example, a difference of 800 R. P. M., and even more within which to work without rapid acceleration of power loss. This range is enough to double the torque as the speed is reduced to one-half of its top speed. Other examples will be obvious from the lower curve.

In arranging the apparatus for use the conditions of speeds, torques, and power delivery wanted can be taken. Then the curve I show for one horse power of delivery can be plotted in proportion for any horse power delivery. The speed and power loss curve will show where the power loss is getting serious under the conditions of work to be done, and the range picked off for minimizing this loss in a practical way. That is, in the lower speed reduction range the power loss curve goes up at a rapidly accelerated rate compared to the speed reduction rate.

This fact is made use of in the embodiment of my invention described by putting a limit on the speed reduction.

Referring to Fig. 5, the adjustment there indicated is for equal speeds of shafts C and D. This results in a zero speed for shaft F. The stop 34 is shown adjustable, not by the attendant through handle K, but by the mechanic or manufacturer in originally setting up the machine for use. Having in mind what I have said about the bottom curve of Fig. 10 and following directions, the mechanic will set up stop 34 far enough to the right and fasten it down so that handle K cannot make the speeds of shafts C and D equal and the speed of shaft F zero. The line of fastening will be made to correspond to the lower speed limit for shaft D, which will be substantially less than that of shaft C. This limit is one which will stop the reduction of shaft D speed at the point where further reduction causes power loss which it is not desired to leave within the discretion of the attendant to incur.

Of course this subject of stopping the machine attendant's discretion is a refinement in the apparatus. My structure is new and useful without the refinement. But whether the automatic stop is used or not, the knowledge that there is a serious power loss in the low range of speed reductions is important. This knowledge can be and should be taken into account in the design and use of the machines embodying my invention.

Having disclosed my power drive improvements, and pointing out that the elements per se may take many forms, without departing from the substance of the disclosure, I claim:

1. A transmission capable of delivering on the part of the output shaft driving torque in excess of that imparted to its input shaft, said transmission including a driving shaft, a driven shaft, a gearing assembly comprising three intermeshing gears, two of the gears of said assembly being coupled to move with said driving and driven shafts, the third gear moving in response to relative movements of said first named gears and providing a reaction point for the same such that power is transmitted from said driving shaft to said driven shaft, a pump unit connected to said third gear to be driven thereby, a hydraulic motor unit connected to said driving shaft, means providing an unobstructed passage from said pump to said motor whereby fluid will flow without reduction of pressure or volume from said pump to said motor, and means operable to vary the internal capacity of said motor unit, whereby said latter unit will function as a metering device to control the volume of fluid delivered by said pump.

2. A transmission capable of delivering on the part of the output shaft driving torque in excess of that imparted to its input shaft, said transmission including a driving shaft, a driven shaft, a gearing assembly comprising three intermeshing gears, two of the gears of said assembly being coupled to move with said driving and driven shafts, the third gear moving in response to relative movements of said first named gears and providing a reaction point for the same such that power is transmitted from said driving shaft to said driven shaft, a pump unit connected to said third gear to be driven thereby, a hydraulic motor unit connected to said driving shaft, means providing an unobstructed passage from said pump to said motor whereby fluid will flow without reduction of pressure or volume from said pump to said motor, and means operable to simultaneously and inversely vary the internal capacities of said pump and motor units between predetermined limits, whereby said motor unit on the driving shaft will function as a metering device to control the volume of fluid delivered by said pump driven by said third gear.

3. A transmission capable of delivering on the part of the output shaft driving torque in excess of that imparted to its input shaft, said transmission including a driving shaft, a driven shaft, a planetary gearing assembly comprising a sun gear fast to the driving shaft, an internal ring gear fast to the driven shaft, a carrier with planet gears in mesh with the sun and ring gears and providing a reaction point for the latter such that power is transmitted from said driving shaft to said driven shaft, a pump unit connected to be driven by said planet gears and carrier, a hydraulic motor unit connected to said driving shaft, means providing an unobstructed passage from said pump to said motor whereby fluid will flow without reduction of pressure or volume from said pump to said motor and hand operable precision means to vary the internal capacity of said motor unit, whereby said latter unit will function as a metering device to control the volume of fluid delivered by said pump to drive said motor on the driving shaft.

4. A transmission capable of delivering on the part of the output shaft driving torque in excess of that imparted to its input shaft, said transmission including a driving shaft, a driven shaft, a gearing assembly comprising three intermeshing gears, two of the gears of said assembly being coupled to move with said driving and driven shafts, the third gear moving in response to relative movements of said first named gears and providing a reaction point for the same such that power is transmitted from said driving shaft to said driven shaft, a positive action pump unit connected to said third gear to be driven thereby, a positive action hydraulic motor unit connected to said driving shaft, means providing an unobstructed passage from said pump to said motor whereby fluid will flow without reduction of pressure or volume from said pump to said motor, adjustable means operable to simultaneously and inversely vary the internal capacities of said pump and motor units, whereby the motor unit will function as an adjustable metering device and the pump unit as an adjustable pump device to control the volume of fluid delivered by said pump, and automatic relatively adjustable stop devices to keep said adjustable means within a predetermined range such that the pump and motor will not respectively reverse their functions but will be maintained for operation within a predetermined and efficient range of operations for the purpose described.

WARREN H. DE LANCEY.